United States Patent
Grunnet et al.

(10) Patent No.: US 11,519,386 B2
(45) Date of Patent: Dec. 6, 2022

(54) INDIVIDUAL PITCH CONTROL FOR WIND TURBINES

(71) Applicant: VESTAS WIND SYSTEMS A/S, Aarhus N (DK)

(72) Inventors: Jacob Deleuran Grunnet, Tranbjerg J (DK); Tobias Gybel Hovgaard, Ry (DK)

(73) Assignee: VESTAS WIND SYSTEMS A/S, Aarhus N. (DK)

( * ) Notice: Subject to any disclaimer, the term of this patent is extended or adjusted under 35 U.S.C. 154(b) by 47 days.

(21) Appl. No.: 16/647,267

(22) PCT Filed: Sep. 11, 2018

(86) PCT No.: PCT/DK2018/050225
§ 371 (c)(1),
(2) Date: Mar. 13, 2020

(87) PCT Pub. No.: WO2019/052617
PCT Pub. Date: Mar. 21, 2019

(65) Prior Publication Data
US 2020/0271093 A1  Aug. 27, 2020

(30) Foreign Application Priority Data

Sep. 15, 2017 (DK) .............................. PA201770698

(51) Int. Cl.
*F03D 7/04* (2006.01)
*F03D 7/02* (2006.01)

(52) U.S. Cl.
CPC ........... *F03D 7/0224* (2013.01); *F03D 7/024* (2013.01); *F03D 7/0296* (2013.01); *F03D 7/045* (2013.01);
(Continued)

(58) Field of Classification Search
CPC ...... F03D 7/0224; F03D 7/024; F03D 7/0296; F03D 7/045; F03D 7/047; F05B 2260/821;
(Continued)

(56) References Cited

U.S. PATENT DOCUMENTS 7,452,185 B2 * 11/2008 Ide ........................ F03D 7/043
416/35
8,622,698 B2 * 1/2014 Kristoffersen .......... F03D 7/024
416/1
(Continued)

FOREIGN PATENT DOCUMENTS

EP  1666723 A1  6/2006
EP  2175131 A2  4/2010
(Continued)

OTHER PUBLICATIONS

Danish Patent and Trademark Office Search Report for Application No. PA 2017 70698 dated Feb. 6, 2018.
(Continued)

*Primary Examiner* — Richard A Edgar
*Assistant Examiner* — Jason G Davis
(74) *Attorney, Agent, or Firm* — Patterson + Sheridan, LLP

(57) ABSTRACT

A method of controlling pitch of individual blades in a wind turbine is described, together with a suitable controller. Wind speed is determined as a function of azimuthal angle. Wind speed is then predicted for individual blades over a prediction horizon using this determination of wind speed as a function of azimuthal angle. The predicted wind speed for each individual blade is used in a performance function, which is optimized to control individual blade pitches.

17 Claims, 8 Drawing Sheets

(52) U.S. Cl.
CPC ........ *F03D 7/047* (2013.01); *F05B 2260/821* (2013.01); *F05B 2260/964* (2013.01); *F05B 2270/32* (2013.01); *F05B 2270/321* (2013.01); *F05B 2270/322* (2013.01); *F05B 2270/326* (2013.01); *F05B 2270/404* (2013.01)

(58) Field of Classification Search
CPC ............ F05B 2260/964; F05B 2270/32; F05B 2270/321; F05B 2270/322; F05B 2270/326; F05B 2270/404
See application file for complete search history.

(56) References Cited

U.S. PATENT DOCUMENTS

| | | | | |
|---|---|---|---|---|
| 10,878,385 | B2 * | 12/2020 | Horrell | G06Q 10/067 |
| 11,022,100 | B2 * | 6/2021 | Daher Adegas | F03D 7/048 |
| 2011/0229300 | A1 * | 9/2011 | Kanev | F03D 7/043 |
| | | | | 415/1 |
| 2012/0128488 | A1 | 5/2012 | Kristoffersen | |
| 2013/0022463 | A1 * | 1/2013 | Zuteck | F03D 1/0675 |
| | | | | 416/1 |
| 2014/0154075 | A1 | 6/2014 | Kristoffersen et al. | |
| 2017/0012289 | A1 | 1/2017 | Kawakita et al. | |
| 2017/0122289 | A1 | 5/2017 | Kristoffersen et al. | |

FOREIGN PATENT DOCUMENTS

| | | |
|---|---|---|
| EP | 2927484 A1 | 10/2015 |
| WO | 2019052617 A1 | 3/2019 |

OTHER PUBLICATIONS

PCT Written Opinion of the International Searching Authority for Application No. PCT/DK2018/050225 dated Feb. 6, 2018.
PCT International Search Report for PCT/DK2018/050225 dated Nov. 23, 2018.
Johannes Friis et al., "Repetitive Model Predicitve Approach to Individual Pitch Control of Wind Turbines," IEEE, Dec. 12, 2011, pp. 3664-3670.
Mirzaei Mohmood et al., "An MPC Approach to Individual Pitche Control of Wind Turbines Using Uncertain LIDAR Measurements," 2013, ECC, pp. 490-495.
European Patent Office, Communication Pursuant to Article 94(3) EPC for Application 18 773 338.1-1007 dated Feb. 16, 2022.

* cited by examiner

INDIVIDUAL PITCH CONTROL FOR WIND TURBINES

TECHNICAL FIELD

The present invention relates generally to individual pitch control for wind turbines.

BACKGROUND

Wind turbine control technology is used for optimisation of power and minimisation of loads. Conventional control approaches use a combination of collective control and cyclic control, with the two control types being decoupled from each other.

Cyclic pitch is used to control a number of factors, such as side-side tower damping, tilt control, yaw control and tower torsional damping. These factors do not have a simple relationship to each other, and when using cyclic pitch to control one objective it may be difficult to address another objective effectively. This can lead to the need to trade off between objectives and a complex calculation.

It would be desirable to control blade pitch individually to allow multiple objectives to be addressed effectively. There are also phenomena, such as complex turbulence (as can be found in the wake of an upstream turbine) that are difficult to address in either collective control or cyclic control approaches. Individual pitch control for each blade would allow loads to be reduced effectively even in complex environmental conditions.

Model predictive control is a powerful approach to providing wind turbine control. A controller is provided with a wind turbine model function operating on a number of input variables, and control outputs are derived from this function, typically by an optimisation. This optimisation may be difficult to achieve in practice if the wind turbine model function is complex. Individual pitch control is not provided for at present in model predictive control approaches, as resulting wind turbine model functions would be too complex for control outputs to be derived effectively by normal optimisation methods.

It would be desirable to address one or more of these issues to provide effective individual pitch control for wind turbines.

SUMMARY OF THE INVENTION

In a first aspect, embodiments of the invention provide a method of controlling pitch of individual blades in a wind turbine, the method comprising: determining wind speed as a function of azimuthal angle; predicting wind speed for an individual blade over a prediction horizon using the determination of wind speed as a function of azimuthal angle; and using the predicted wind speed for each individual blade in a performance function, and optimizing the performance function to control pitch of the individual blades.

This approach allows the performance function to be linearised and capable of convex optimisation by removing non-linearity to the input side. This allows the performance function to form the basis of model predictive control with individual blade pitches as outputs, rather than conventional collective and cyclic pitch for all blades as outputs.

The method may further comprise determination of forces acting on an individual blade over the prediction horizon. This can be achieved from predicted blade position and geometric factors for each blade. This may comprise determining in-plane forces and out-of-plane forces acting on the individual blade.

Azimuthal angle of an individual blade over the prediction horizon may be determined using predicted rotor speed. Wind speed as a function of azimuthal angle may be determined from predicted rotor speed and blade load for individual blades.

In embodiments, the wind speed is predicted for an individual blade over a prediction horizon using an extended Kalman filter.

As noted above, the performance function may be a model predictive control function. This may comprise one or more of a tilt and yaw load reduction; side-side tower damping; and tower clearance control.

As noted above, optimizing the performance function may comprise performing a convex optimisation on the performance function.

In a second aspect, the invention provides a controller for a wind turbine, wherein the controller is adapted to control pitch of individual blades in the wind turbine, wherein the controller is adapted to: determine wind speed as a function of azimuthal angle; predict wind speed for an individual blade over a prediction horizon using the determination of wind speed as a function of azimuthal angle; and use the predicted wind speed for each individual blade in a performance function, and optimize the performance function to control pitch of the individual blades.

The controller may be further adapted to determine forces acting on an individual blade over the prediction horizon. The controller may be adapted to determine azimuthal angle of an individual blade over the prediction horizon using predicted rotor speed. The controller may be adapted to determine wind speed as a function of azimuthal angle from predicted rotor speed and blade load for individual blades. The performance function may be a model predictive control function.

In a third aspect, the invention provides a computer program product for programming a controller of a wind turbine adapted to control pitch of individual blades in the wind turbine, wherein the computer program product is adapted to program a processor of the controller to perform the function of a controller according to the second aspect of the invention.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that matter.

BRIEF DESCRIPTION OF THE DRAWINGS

One or more embodiments of the invention will now be described, by way of example only, with reference to the accompanying drawings, in which.

DETAILED DESCRIPTION

Figure 1:
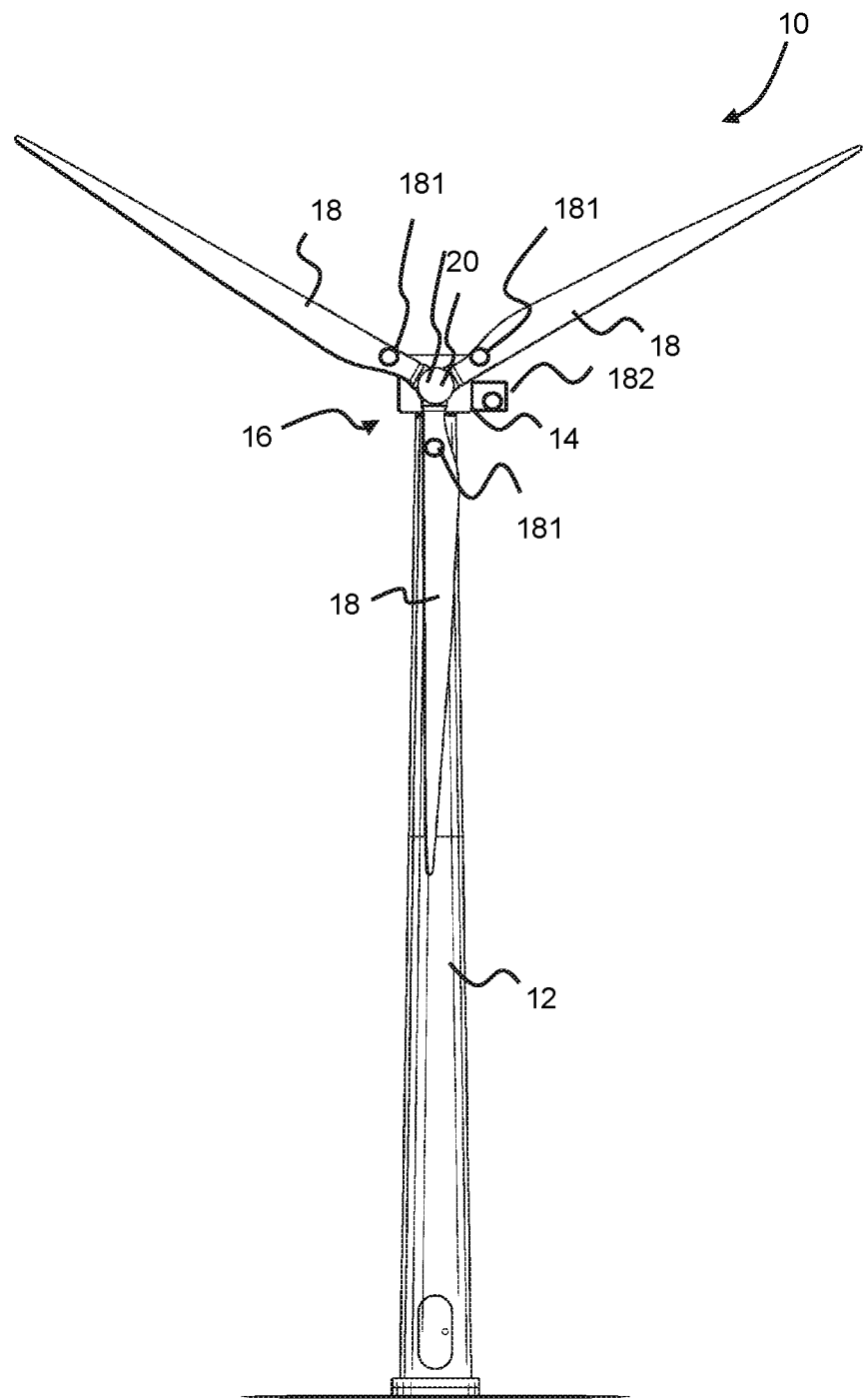
FIG. 1 shows a wind turbine in which embodiments of the invention may be incorporated.

FIG. 1 shows a wind turbine 10 in which an embodiment of the invention may be incorporated. The wind turbine 10 comprises a tower 12 supporting a nacelle 14 to which a rotor 16 is mounted. The rotor 16 comprises a plurality of wind turbine blades 18 that extend radially from a hub 20. In this example, the rotor 16 comprises three blades 18 although other configurations are possible.

Shown within each blade 18 is a blade load sensor 181 (in other embodiments there may be multiple blade load sensors allowing blade loads to be represented by more than a single variable). The sensing element may be a fibre optic strain gauge, a resistive strain gauge, or any other appropriate detector. A rotor wind speed detector 182 is also shown—again, this measurement may be performed in several ways as the skilled person will appreciate, one being through LIDAR as the skilled person will appreciate from the literature of wind turbine design and control.

Figure 2:
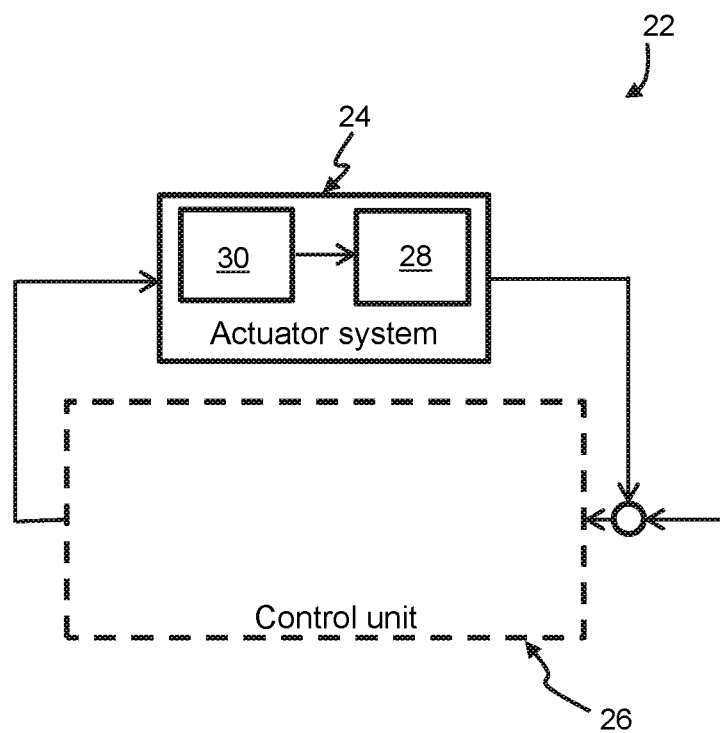
FIG. 2 is a schematic view of a control system in accordance with an embodiment of the invention.

FIG. 2 shows a wind turbine control system 22 in accordance with an embodiment of the invention which may be implemented in the wind turbine 10 of FIG. 1. Here, the control system 22 includes an actuator system 24 that is controlled by a control unit 26. In this particular embodiment, the actuator system 24 may be or comprise a pitch system for controlling the pitch of one or more of the wind turbine blades 18 which may include a hydraulic actuator 28 arranged to adjust blade pitch in a known manner. The actual position of the actuator 28 is controllable by an actuator position control unit 30 which provides a positioning command signal to the hydraulic actuator 28.

It should be appreciated that the control unit 26 and actuator system 24 may be replicated for each of the blades 18 of the wind turbine 10 so that the position of each blade 18 may be controlled independently—in embodiments described here, this is done to provide individual pitch control for each blade.

It should be noted at this point that the pitch system of the wind turbine 10 is just one example of a wind turbine system that could be controlled and that the control unit 26 could also be used to control other wind turbine systems. For instance, the actuator system 24 may be an electric or hydraulic yaw drive for the nacelle 14 of the wind turbine 10 to provide rotational position control of the nacelle 14 with respect to the tower 12. Another example would be a converter control system where the actuator system 24 may be a power converter of the generation system of the wind turbine 10 that converts AC power delivered by the generator to a variable-frequency AC power output via a DC link in a process known as 'full power conversion'. The skilled person would appreciate that the principle of the invention described herein could be applied to any wind turbine system that requires high speed real time control.

Figure 3:
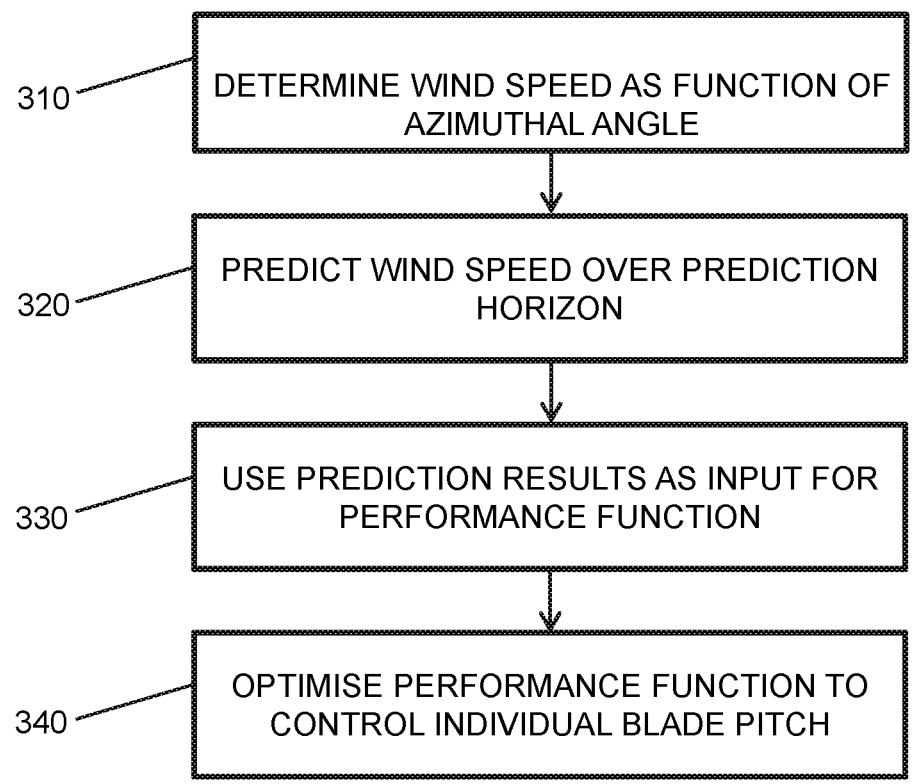
FIG. 3 illustrates an approach to model predictive control according to an embodiment of the invention.

FIG. 3 shows schematically a method of controlling pitch of individual blades in a wind turbine according to an embodiment of the invention. Firstly, wind speed is determined 310 as a function of azimuthal angle for different wind turbine blade positions. This information is used to predict 320 wind speed for an individual blade over a prediction horizon. This is provided 330 as an input to a performance function. The performance function is optimized 340 to control pitch of individual blades of the wind turbine. Different steps in this process, and the functional elements used to perform them, are discussed below.

Figure 4:
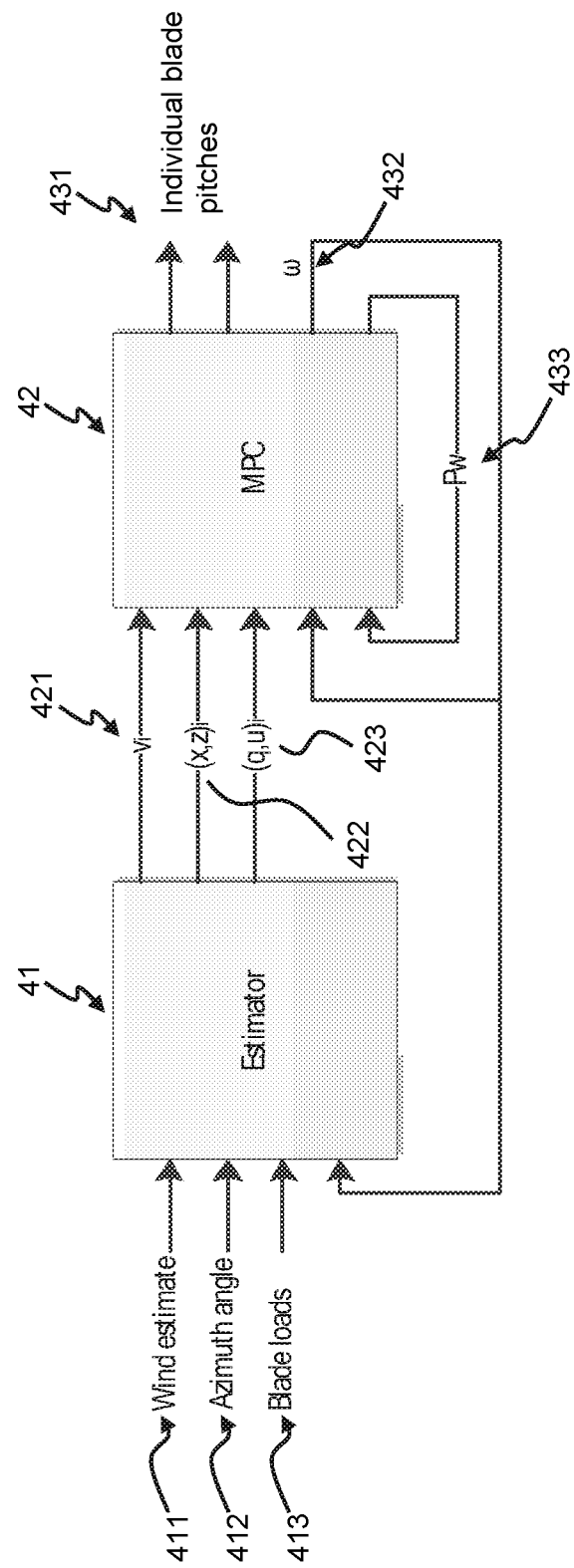
FIG. 4 shows a control system according to an embodiment of the invention.

A specific embodiment implementing this approach is shown schematically in FIG. 4. Two functional elements are shown—an estimator unit 41 and a model predictive control unit 42. Both these units may be provided by suitable software running on any suitable computing substrate using conventional or customer processors and memory. The estimator unit 41 and the model predictive control unit 42 may use a common computing substrate (for example, they may run on the same server) or separate substrates, or one or both may themselves be distributed between multiple computing devices.

The estimator unit 41 receives as inputs a rotor wind estimate 411 and blade load values 413 for each blade with associated azimuth angles 412. A generator speed 432 derived as an output from the model predictive control unit 42 as a predicted trajectory over the prediction horizon is also fed back to the estimator unit 41. The outputs from the estimator unit 41 are local wind speeds 421 for each blade over a prediction horizon together with in-plane force components 422 and tilt and yaw force components 423 for each blade. The outputs from the estimator unit 41 are fed into the model predictive control unit 42 as inputs, together with the generator speed 432 and a rotor power 433 fed back from the model predictive control unit 42 output side. The model predictive control unit 42 provides pitch control 431 for each blade according to an optimisation result.

This approach is effective as it allows for convex optimisation of the control model, despite the overall non-linearity of the functions describing the forces acting on the blades. Convex optimisation generally requires a linear system, so model predictive control has typically been limited in its objective by the need to obtain an effective optimisation. One previously described approach to improving this is by a change of variables so that the model predictive control function is based on energy (described in Hovgaard et al, "Model predictive control for wind power gradients" in *Wind Energy* (2014), John Wiley & Sons), but while this improves the options for optimising the model predictive control function it does not enable it to address individual pitch control for each blade.

Embodiments of the invention allow pitch control for individual blades because this approach allows non-linearity to be addressed in the estimator unit 41 enabling the model of the model predictive control unit 42 to have individual blade pitch outputs while based on a model capable of convex optimisation. The non-linearity is contained instead within the wind speeds and loads experienced by each blade over the prediction horizon. While consideration has been given to use of predicted wind speed in model predictive control—for example, in Friis et al, "Repetitive Model Predictive Approach to Individual Pitch Control of Wind Turbines"—this has been proposed within the context of an overall model predictive control solution and does not provide for effective optimisation in the same manner as for embodiments of the invention.

Figure 5:
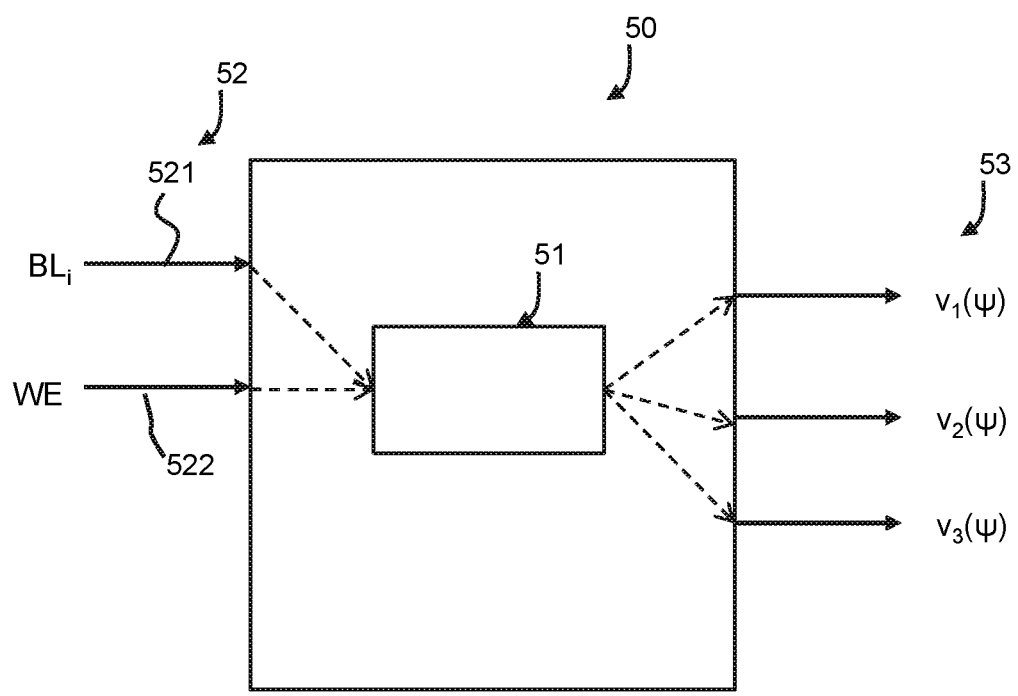
FIG. 5 shows a first stage of an estimator system as shown in FIG. 4.
Figure 6:
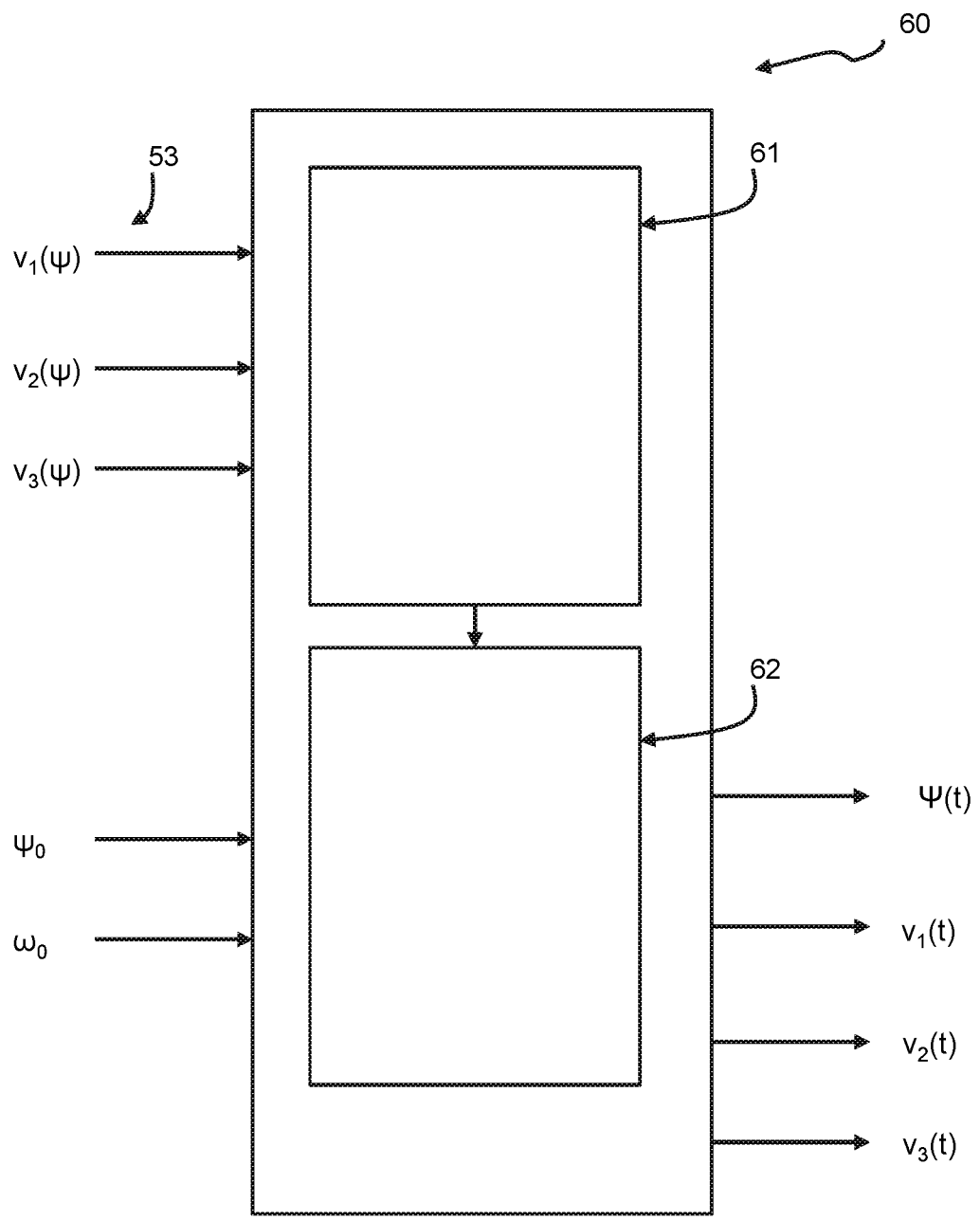
FIG. 6 shows a second stage of an estimator system as shown in FIG. 4.
Figure 7:
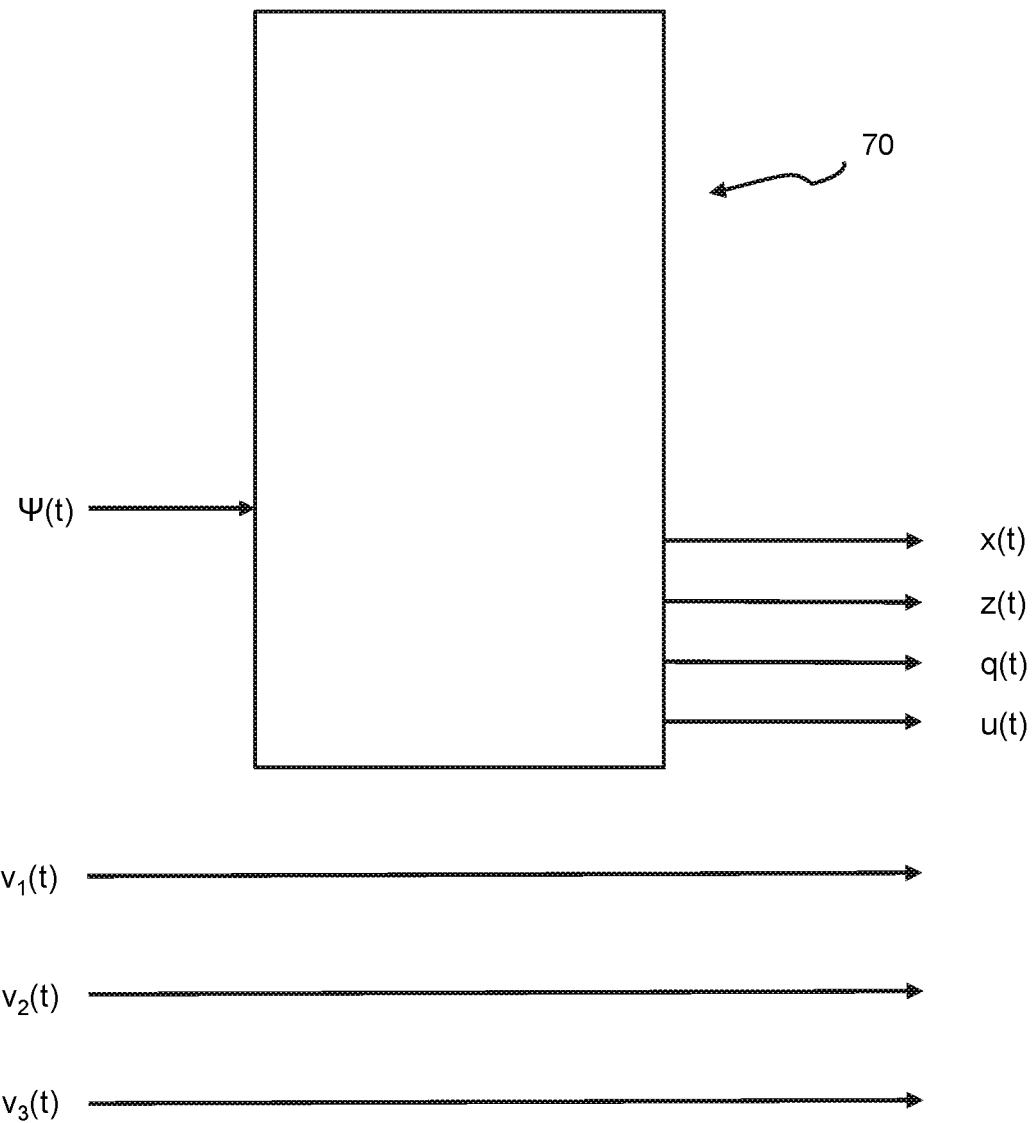
FIG. 7 shows as third stage of an estimator system as shown in FIG. 4.

An embodiment of the estimator unit 41 of FIG. 4 will now be considered in more detail with reference to FIGS. 5, 6 and 7.

Figure 8A:
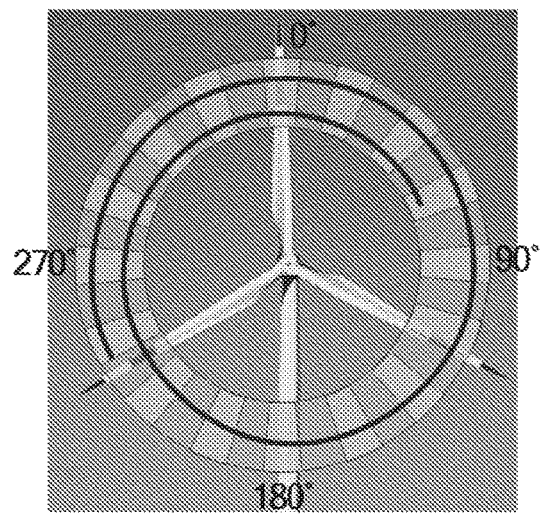
FIG. 8A shows an azimuthal map of wind turbine blade position.

FIG. 5 illustrates a functional element for estimating the local wind speed in different regions of the rotor disc. As shown in FIG. 8A, the rotor disc may be represented as a plurality of rotor positions each with its own azimuthal angle. The functional element 50 for estimating local wind speed is an unknown input observer adapted to estimate a system state variable on the basis of a state model and measurements over time. This is frequently performed in navigation and control processes by use of Kalman filtering, in particular by the use of an Extended Kalman Filter (EKF) for nonlinear systems. While an EKF is used in embodiments of the invention described here, as the skilled person will appreciate other forms of unknown input estimator functions are known and could be employed in alternative embodiments of the invention. Blade aerodynamics will typically be nonlinear, requiring the use of an approach that is adapted for use in nonlinear systems.

The EKF relies on a model 51 and on time varying inputs 52. The model 51 is a model of the physical system of the wind turbine allowing calculation of relevant outputs from the available inputs. In this case, key inputs are the blade load values $BL_i$ 521 for each blade, and the rotor wind estimate WE 522. The rotor wind estimate is an estimate of the wind speed averaged over the rotor as a whole. The rotor wind estimate can be derived in one of a number of ways: use of an anemometer on the nacelle as a representative measurement for the rotor as a whole; calculation from known pitch angle, rotational speed and grid power values (for example by look up in the Cp table); or by an estimation process. In embodiments, further inputs may be provided to the EKF, or to other stages of the estimator. The physical model allows wind speed experienced by a blade to be determined from the blade load value and the overall rotor wind estimate, based on an engineering analysis of the physical system. This model can be prepared by the skilled person using standard engineering principles, and the detail of this model is not the subject of the present specification.

Figure 8B:
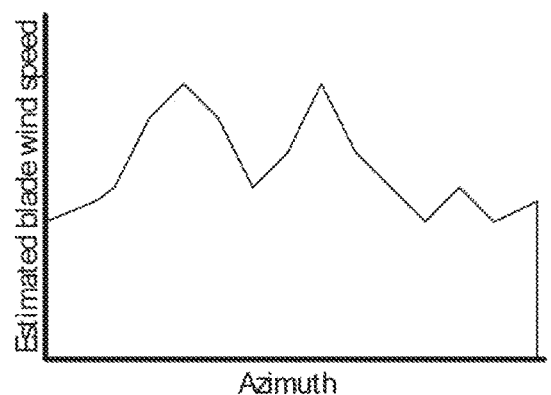
FIG. 8B shows a map of blade wind speed for azimuthal position in accordance with an embodiment of the invention.

This approach allows for determination of wind speed for each azimuthal position providing a wind value map represented here as wind values 53 for each blade according to position. Values of the estimator are updated when a blade moves through the relevant azimuthal position resulting in relevant input values—such as blade load—being updated. The output of the EKF is a map of local wind speed against azimuthal angle ($v(\psi)$, as seen in FIG. 8B. This is used as input for the next stage of the estimator unit, shown in FIG. 6.

Figure 8C:
FIG. 8C shows a map of estimated blade wind speed for a given blade over a prediction horizon in accordance with an embodiment of the invention.
Figure 8C:
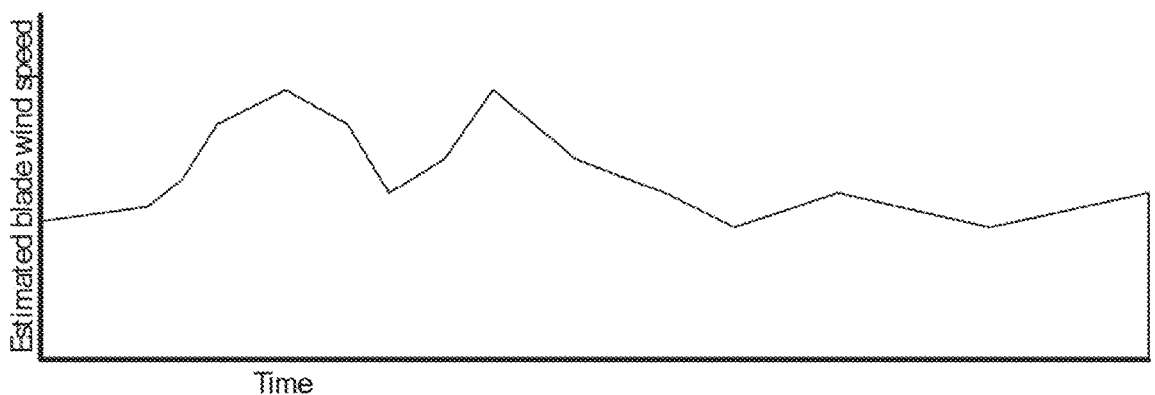

The second stage 60 of the estimator uses the wind value map 61 derived from the EKF 50 and uses current rotor azimuth angle $\psi_0$ and predicted rotor speed $\omega_0$ as further inputs to enable the position of each blade to be detected over a future period as shown in the blade position prediction path 62, so the second stage 60 of the estimator is able to produce a local wind speed experienced for each blade over its path over a prediction horizon, as shown in FIG. 8C. This prediction horizon will be set to be sufficiently long to allow for effective model predictive control but sufficiently short that there will still be reasonable confidence in the accuracy of the predicted values throughout the prediction period.

The third stage 70 of the estimator is shown in FIG. 7. This stage enables force components for each blade to be determined from the predicted angles of the blade over the prediction horizon. These force components are determined as a function of azimuthal angle for each blade, with decomposition into in-plane forces (x and z) and out-of-plane forces (q and u, tilt and yaw respectively), with the force components simply being derived as a sinusoidal function dependent on the azimuth angle with a phase offset according to the force direction, e.g.

$x=\cos(\psi), z=-\sin(\psi)$

These force components are vectors with the same length as the prediction horizon.

The approximated functions describe the magnitude of in-plane and out-of-plane forces from each blade, $F_{in\text{-}plane_i}$ and $F_{out\text{-}plane_i}$ respectively, $F_{in\text{-}plane_i} = f(P_{w_i}, K, v_i)$ $F_{out\text{-}plane_i} = f(P_{w_i}, K, v_i)$ These functions are approximated directly from the aerodynamics of the blades. For example, thrust force is normally described as a function of the thrust coefficient, Ct, which is a function of tip-speed ratio (determined by rotational energy K and wind speed v) and pitch angle (defined by rotor power $P_w$ through the Cp and Ct tables), is the thrust force (per blade) as a function of rotor power (per blade), rotational energy and local wind speed, derived through Cp and Ct tables. In-plane forces can be derived from aerodynamic properties of the blades in a similar way.

Individual blade values may be combined into the resulting forces, side-side ($F_{ss}$), up-down ($F_{ud}$), tilt ($F_{tilt}$), and yaw ($F_{yaw}$) by summation of the relevant force components over each blade. This is however not done as part of the estimator process—any such summation takes place in the MPC.

$$F_{ss} = \sum_i F_{in\text{-}plane_i} x_i$$

$$F_{ud} = \sum_i F_{in\text{-}plane_i} z_i$$

$$F_{tilt} = \sum_i F_{out\text{-}plane_i} q_i$$

$$F_{yaw} = \sum_i F_{out\text{-}plane_i} u_i$$

Reverting to FIG. 4, the estimator unit 41 provides individual blade wind speeds, and a geometrical determination of in-plane and out-of-plane force components for each blade. These outputs are here provided as vector signals for the whole prediction horizon. This approach removes nonlinearity from the model predictive control unit 42 objective function, enabling convex optimisation of this function.

Specific model predictive control functions are outside of the scope of this specification, which is directed to providing a solution that allows for individual pitch control because nonlinearities have been removed from the model, rather than specifics of the model itself. As individual pitch can be controlled, rotor power $P_w$ is a control variable of the model with generator speed $\omega$ derived from a model state and with individual blade pitches (rather than a collective pitch and a cyclic pitch) as outputs—another output is the power reference to the generator. (A common symbol is used for rotor speed and generator speed as one can routinely be determined from the other—the relevant factor is determined by gear ratio and the dynamics of the drivetrain). The objective function as well as the constraints are convex, allowing effective real time control. This will now be illustrated by exemplary MPC features using the approach taught above. The objective function implemented by the MPC can address all these features together, with tradeoffs between features addressed by appropriate weighting in the performance function.

Tilt and yaw load reduction—This is one of the most straightforward use cases, The objective function includes a component for tilt and yaw loads such that optimisation minimises this load. This can be achieved, for example, by adding the following terms to the MPC objective function:

$$f = \lambda_1 F_{tilt}^2 + \lambda_2 F_{yaw}^2 + \lambda_3 \Sigma \Delta P_{w,i}^2$$

This performance function component penalizes deviations in tilt and yaw loads from zero, while also punishing pitch variations by minimizing variations in per blade rotor power.

Side-side tower damping—In side-side tower damping, the goal is to reduce tower oscillations. This can be done by expanding the current tower position estimator by including the side-side direction, leading to an estimate of a side-side velocity.

The MPC model is then also extended with a simple single degree of freedom side-side tower model where the inputs are the side-side force generated by individual pitches and the torque produced by the generator.

An objective function component of the following type could be used $$f = \lambda_1 U_{ss}^2 + \lambda_3 \Sigma \Delta P_{w,i}^2$$

where $U_{ss}$ is the tower side-side speed. This function minimizes tower side-side movements while also penalizing heavy pitch activity.

Tower clearance control—A further example is tower clearance control, where the knowledge of the predicted blade azimuth position can be used to limit the out of plane force on the blade, but only when the blade is pointing downwards. This can be done with the following type of constraint for i when azimuth angles are close to 180 degrees, this being a hard limit to ensure that there is sufficient clearance between the blade tip and the tower while the blade is passing.

$$F_{out_{plane_i}} < F_{cleartower}$$

Using this approach, the objective function can be constructed as a combination of linear elements that can be weighted appropriately with the whole function then optimised using a convex optimisation. MPC is based on iterative, finite horizon optimization. At time t the current state is sampled and a cost minimizing control strategy is computed for a time horizon in the future: [t, t+T]. Only the first predicted value for the current sample k is used in the control signal, then the turbine state is sampled again and the calculations are repeated starting from the new current state, yielding a new control trajectory and new predicted state trajectory. The prediction horizon keeps being shifted forward and for this reason MPC is a receding horizon controller.

The invention claimed is:

1. A method of controlling pitch of individual blades in a wind turbine, the method comprising:
   determining wind speed as a function of azimuthal angle;
   predicting wind speed for each individual blade of the individual blades in the wind turbine over a prediction horizon using the determination of wind speed as a function of azimuthal angle;
   using the predicted wind speed for each individual blade in a model predictive control function such that non-linearity is removed from the model predictive control function; and
   performing a convex optimization on the model predictive control function with non-linearity removed to produce an updated model predictive control function; and
   using the updated model predictive control function to adjust the pitch of the individual blades of the wind turbine.

2. The method of claim 1, further comprising determining forces acting on each individual blade over the prediction horizon.

3. The method of claim 2, comprising determining in-plane forces and out-of-plane forces acting on each individual blade.

4. The method of claim 1, comprising determining azimuthal angle of each individual blade over the prediction horizon using predicted rotor speed.

5. The method of claim 1, wherein wind speed as a function of azimuthal angle is determined based on an estimate of wind speed averaged over rotation of a rotor of the wind turbine and blade load for the individual blades.

6. The method of claim 1, wherein the wind speed is predicted for each individual blade over the prediction horizon using an extended Kalman filter.

7. The method of claim 1, wherein the model predictive control function comprises one or more of a tilt and yaw load reduction, side-side tower damping, and tower clearance control.

8. A controller for a wind turbine, wherein the controller comprises a processor, a memory and an I/O; and wherein the controller is adapted to control pitch of individual blades in the wind turbine by performing an operation comprising:
   determining wind speed as a function of azimuthal angle;
   predicting wind speed for each individual blade of the individual blades in the wind turbine over a prediction horizon using the determination of wind speed as a function of azimuthal angle;
   using the predicted wind speed for each individual blade in a model predictive control function such that non-linearity is removed from the model predictive control function;
   performing a convex optimization on the model predictive control function with non-linearity removed to produce an updated model predictive control function; and
   using the updated model predictive control function to adjust the pitch of the individual blades of the wind turbine.

9. The controller of claim 8, wherein the controller is further adapted to determine forces acting on each individual blade over the prediction horizon.

10. The controller of claim 8, wherein the controller is adapted to determine azimuthal angle of each individual blade over the prediction horizon using predicted rotor speed.

11. The controller of any of claim 8, wherein the controller is adapted to determine wind speed as a function of azimuthal angle based on an estimate of wind speed averaged over rotation of a rotor of the wind turbine and blade load for the individual blades.

12. A computer program product comprising a controller of a wind turbine adapted to control pitch of individual blades in the wind turbine, wherein a processor of the controller is configured to perform an operation, comprising:

determining wind speed as a function of azimuthal angle;
predicting wind speed for each individual blade of the individual blades in the wind turbine over a prediction horizon using the determination of wind speed as a function of azimuthal angle;
using the predicted wind speed for each individual blade in a model predictive control function such that non-linearity is removed from the model predictive control function;
performing a convex optimization on the model predictive control function with non-linearity removed to produce an updated model predictive control function; and
using the updated model predictive control function to adjust the pitch of the individual blades of the wind turbine.
optimizing the model predictive control function with non-linearity removed to control pitch of the individual blades by performing a convex optimization on the model predictive control function.

13. The computer program product of claim 12, wherein the operation further comprises determining forces acting on each individual blade over the prediction horizon.

14. The computer program product of claim 13, wherein the operation comprises determining in-plane forces and out-of-plane forces acting on each individual blade.

15. The computer program product of claim 12, wherein the operation comprises determining azimuthal angle of each individual blade over the prediction horizon using predicted rotor speed.

16. The computer program product of claim 12, wherein wind speed as a function of azimuthal angle is determined based on an estimate of wind speed averaged over rotation of a rotor of the wind turbine and blade load for the individual blades.

17. The computer program product of claim 12, wherein the wind speed is predicted for each individual blade over the prediction horizon using an extended Kalman filter.

* * * * *